No. 12,514. REISSUED JULY 24, 1906.

S. SWEDENBORG.

CLAM SHELL BUCKET.

APPLICATION FILED APR. 18, 1905.

3 SHEETS—SHEET 1.

Witnesses.
E. B. Gilchrist
W. L. McGarrell.

Inventor
Swan Swedenborg,
By his Attorneys,
Thurston & Bates

THE NORRIS PETERS CO., WASHINGTON, D. C.

No. 12,514. REISSUED JULY 24, 1906.

S. SWEDENBORG.

CLAM SHELL BUCKET.

APPLICATION FILED APR. 18, 1905.

3 SHEETS—SHEET 2.

Witnesses.
E. B. Gilchrist
W. L. McGarrell.

Inventor
Swan Swedenborg,
By his Attorneys,
Thurston & Bates.

THE NORRIS PETERS CO., WASHINGTON, D. C.

No. 12,514. REISSUED JULY 24, 1906.

S. SWEDENBORG.

CLAM SHELL BUCKET.

APPLICATION FILED APR. 18, 1905.

2 SHEETS—SHEET 2.

Witnesses.
E. B. Gilchrist
W. L. McGarrell.

Inventor.
Swan Swedenborg,
By his Attorneys,
Thurston & Bates.

THE NORRIS PETERS CO., WASHINGTON, D. C.

UNITED STATES PATENT OFFICE.

SWAN SWEDENBORG, OF ASHTABULA, OHIO.

CLAM-SHELL BUCKET.

No. 12,514. Specification of Reissued Letters Patent. Reissued July 24, 1906.

Original No. 12,191, dated January 12, 1904. Application for reissue filed April 18, 1905. Serial No. 256,327.

*To all whom it may concern:*

Be it known that I, SWAN SWEDENBORG, a citizen of the United States, and a resident of Ashtabula, county of Ashtabula, and State of Ohio, have invented certain new and useful Improvements in Clam-Shell Buckets, of which the following is a specification, the principle of the invention being herein explained and the best mode in which I have contemplated applying that principle, so as to distinguish it from other inventions.

The annexed drawings and the following description set forth in detail one mechanical form embodying the invention, such detail construction being but one of various mechanical forms in which the principle of the invention may be used.

Figure 1:
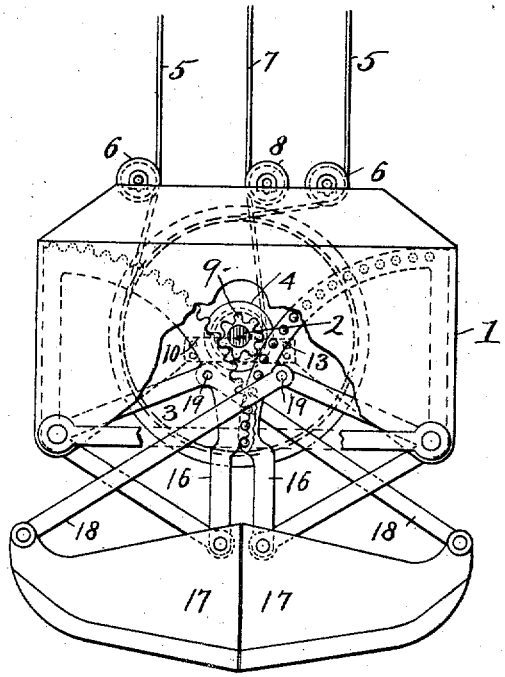
Figure 2:
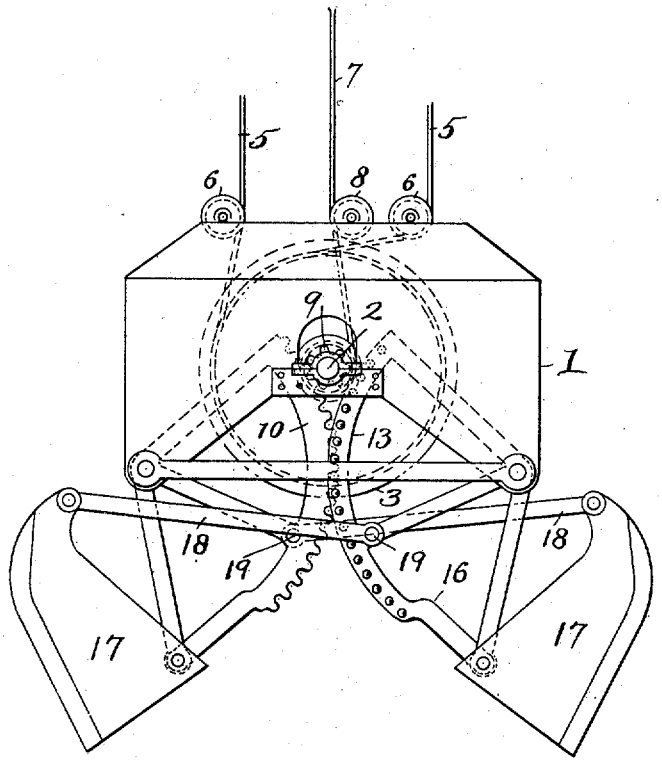
Figure 3:
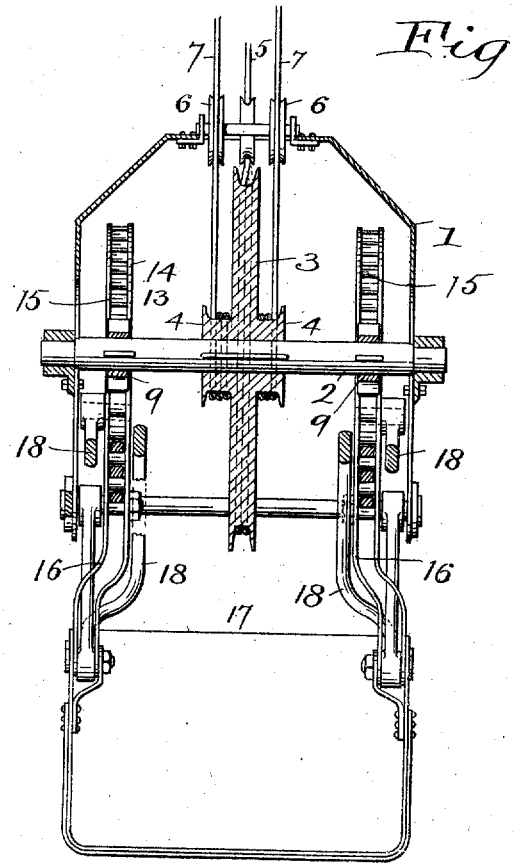
Figure 4:
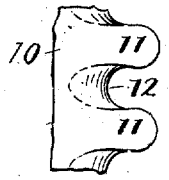
Figure 5:
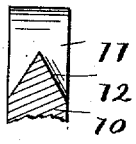

In said annexed drawings, Figure 1 represents a side elevation of my improved clam-shell bucket, showing it closed. Fig. 2 is a similar view of the open bucket; Fig. 3, a transverse section of the closed bucket; Fig. 4, a detail side view of the cogs of one of the quadrant-racks, and Fig. 5 a cross-section of the same.

The bucket has a frame or casing 1, in the middle of which is a transverse shaft 2, journaled in bearings in the sides of the frame. This shaft has a large pulley 3 at its middle and two smaller pulleys 4, one at each side of the large pulley. Two hoisting-ropes 5 are secured to the large pulley and may be wound upon the same, and said ropes are guided on guide-sheaves 6, journaled in the top of the frame, one near each end of the same. Two opening-ropes 7 are secured to and may be wound upon the two small pulleys and are guided by two guide-sheaves 8, journaled in the middle of the top of the frame. Two pinions 9 are secured upon the shaft, one near each end, and mesh with two geared quadrant-racks 10, fulcrumed at the centers of their arcs in the lower corner of the frame. These racks have teeth 11, the spaces between which are sharpened from the sides to an edge 12, as will be hereinafter more fully referred to. These quadrant-racks mesh with an opposed pair of quadrant-racks 13, fulcrumed at the centers of their arcs in the opposite lower corner of the frame. The racks 13 are open at the base of their teeth to allow material caught on the teeth to drain out. Such open rack may be conveniently made by two parallel segmental bars 14, having short rods 15 between them to form teeth. The sector-shaped frames 16 of the racks extend a distance below the quadrant-racks, and the upper and inner corners of the clam-shell jaws 17 are pivoted to the lower corners of the frames. Swinging links 18 are respectively pivoted at their lower ends to said jaws and preferably near the outer ends thereof, as shown. The pivots 19, by which the upper ends of these links are supported, are in the best construction connected with the opposite sectors at points a short distance above the lower ends of the racks thereon, substantially as shown. The outer ends of the jaws are curved upward, so as to bring the pivots of the links even with the pivots of the frames and jaws when the jaws are closed. The sides of the jaws are closed, and the bottoms of the jaws are preferably flat for about one-half of their length from their meeting edges, whereupon they curve upward, so as to allow the ore, coal, or dirt, or whatever substance they are working in, to easily slide outward as the jaws close into such substance.

In practice the hoisting-ropes are suitably connected to a hoisting-drum or other similar device, which may pay out or draw in upon said ropes in unison with the draft upon or release of the hoisting-ropes. We will assume that the bucket is open and resting with its open jaws upon the surface of the ore or coal pile or whatever other substance the bucket is operated upon. Draft is now exerted upon the hoisting-ropes, which will first rotate the large pulley and the pinions upon the same, the opening-ropes being free to pay out as they are wound upon the small pulleys. The revolving pinions will raise the segments meshing therewith, these in turn raising the other segments. This will draw together the inner ends of the jaws, closing them in the substance between them, and the links will push outward upon the upturned outer ends of the jaws, forcing the latter into a horizontal position. The jaws will thus dig out of the substance the load to be hoisted, and when the jaws are closed the hoisting-ropes will hoist and support the full bucket until the latter is conveyed to the point of unloading. When the bucket is unloaded, it may be lowered toward the dump or held suspended over the same, and draft is exerted upon the opening-ropes to unwind them off from the small pulleys, and to thus reverse the former movement of the pinions. This will open the jaws of the bucket, and the links will draw upon the outer ends of the jaws to tilt them into a nearly vertical position. After the bucket is emptied the same is again conveyed to a position above the point where it is to be loaded, whereupon the bucket is lowered, suspended by the opening-ropes, the hoisting-ropes paying easily out until it again is ready to bite into the substance to be conveyed, when draft is again exerted upon the hoisting-ropes, the opening-ropes being easily drawn without draft upon their pulleys. Two hoisting-ropes and two opening-ropes are illustrated and preferably used on account of the better balance and greater steadiness attained for the bucket; but one rope of each kind may be used instead of two. When the bucket is operated in coal or ore or other lumpy substance, it may happen that lumps of the substance may get in between the racks as they close together. The sharp edges of the interdental spaces of the rack will cut such lumps or throw them to one side, and small lumps may be easily forced through the open spaces between the teeth of the open rack.

The bucket opens and closes by positive movement and cannot be hoisted until completely closed. The hoisting-ropes acting upon the large pulley will close the jaws with great force and less speed and will hold them firmly closed, while the opening-ropes acting upon the small pulleys will open the jaws with great speed and by only using the slight force necessary.

By the employment of a pair of intermeshing geared segments and a pinion engaging the teeth of one of them an extremely simple and effective operating mechanism is provided. When the bucket is dropped open into the material to be elevated, the material would be liable to clog some of the teeth of the segments were ordinary racks employed; but by means of an open-toothed rack this objection is overcome and the mechanism rendered thoroughly practicable.

Other modes of applying the principle of my invention may be employed for the mode herein explained. Change may therefore be made as regards the mechanism thus disclosed, provided the principles of construction set forth, respectively, in the following claims are employed.

I claim—

1. In a clam-shell bucket, the combination, with the scoops, of an operating mechanism therefor comprising oscillatable members having intermeshing gear-teeth, and a driving-pinion engaging such teeth on one of the members.

2. In a clam-shell bucket, in combination, a pair of pivoted sectors meshing with each other, a pinion meshing with one sector, and a pair of scoops operated by said sectors.

3. In a clam-shell bucket, the combination with a frame, a pair of sectors pivotally mounted thereon and having intermeshing teeth, a driving-pinion having teeth meshing with the same teeth of one of said sectors, which are adapted to mesh with the other sector, and scoops operated by the sectors.

4. In a clam-shell bucket, the combination with scoop members, of an operating mechanism comprising a pair of oscillatable members geared together, a rotatable pinion geared directly with one of said members, and a pair of sheaves for driving said pinion in opposite directions.

5. In a clam-shell bucket, the combination, with scoop members, of a frame, operating mechanism comprising a pair of oscillatable members mounted on the frame and having intermeshing gear-teeth, a rotatable driving member for operating said oscillatable members, a shaft for said driving member mounted on the frame, and large and small sheaves rigid on said shaft.

6. In a clam-shell bucket, the combination of two scoop members, a pair of opposed sectors geared together, links connecting one end of the scoop members with the opposite sector respectively, the other ends of said scoop members being also connected with the sectors.

7. In a clam-shell bucket, the combination of a pair of opposed gear-sectors meshing with each other, a pinion meshing with one of the sectors, a pair of scoops, means connecting the same near one end with the sectors, and links pivoted at their lower ends to the other ends of the scoops and at their upper ends to the sectors.

8. In a clam-shell bucket, the combination with two jaws, of a pair of opposed sectors having segmental racks meshing with each other and fulcrumed to rock on opposed centers, the jaws being supported at one end by the sectors above them, links each pivoted to the other end of the jaw and to the segment of the opposite sector, and means for operating the segmental racks.

9. In a clam-shell bucket, the combination of a frame, two pairs of sectors oscillatably mounted therein on opposite sides of a given plane, a shaft journaled in said frame, two pinions on said shaft meshing with the teeth on one pair of sectors, said sectors meshing directly with the teeth on the other pair of sectors, a sheave on said shaft adapted to rotate it, and a pair of scoop members beneath the sectors on opposite sides of said plane, said scoop members being operatively connected with the sectors.

10. In a clam-shell bucket, the combination with two jaws, of a pair of opposed sectors having means for rocking them upon their opposed centers and having the inner ends of the jaws hinged at the lower ends of their segments, and links each pivoted to the outer end of a jaw and to the segment of the opposite sector.

11. In a clam-shell bucket, the combination with two jaws, of a pair of opposed sectors having segmental racks meshing with each other and fulcrumed to rock on opposed centers and having the inner ends of the jaws hinged at the lower ends of the segments, links each pivoted to the outer end of a jaw and to the segment of the opposite sector, and a pinion meshing with one of the segmental racks and having means for revolving it in opposite directions.

12. In a clam-shell bucket, the combination of two jaws 17, sector-shaped frames 16 fulcrumed on opposite centers and having intermeshing quadrant-racks 10 and 13 and having the inner ends of the jaws pivoted at the lower ends of such racks, links 18 pivoted to said racks and to the outer end of the jaws, a shaft having pinions meshing with racks 10, a large pulley 3 upon said shaft, a hoisting-rope upon said pulley, a small pulley 4 upon the shaft, and an opening-rope upon said pulley.

13. In a clam-shell bucket, the combination of a frame, a pair of opposed sectors mounted thereon, and means for rocking them in opposite directions, with a pair of jaws which are respectively hinged to the lower ends of said sectors, and swinging links whose lower ends are pivotally connected with said jaws respectively.

14. In a clam-shell bucket, the combination of a frame, a pair of opposed sectors mounted thereon, and means for rocking them in opposite directions, with a pair of bucket-jaws having their inner ends hinged respectively to the lower ends of said sectors, and swinging links whose lower ends are pivotally connected with said jaws, respectively, near the outer ends thereof.

15. In a clam-shell bucket, the combination of a frame, a pair of opposed sectors mounted thereon, having segmental racks meshing with each other, with a pair of bucket-jaws which are pivotally connected at their front ends with the lower ends of the sectors, and swinging links whose lower ends are respectively pivoted to said jaws near the outer ends thereof, and a pinion meshing with one of the segmental racks and having means for revolving it in opposite directions.

16. In a clam-shell bucket, the combination with scoop members and operating mechanism therefor including meshing gears, one of said gears having the spaces between its teeth open opposite the entrance for the teeth of coöperating gear to allow material to pass out.

17. In a clam-shell bucket, the combination with jaws of two segment-racks meshing with each other and adapted to actuate the jaws, one of said racks consisting of two parallel bars having short connecting members forming teeth for the other segment and leaving open spaces through such rack between the teeth.

18. In a clam-shell bucket, two quadrant-racks meshing with each other and actuating the jaws, one of said racks consisting of two parallel bars having short and round transverse rods to form an open rack and the other rack being cogged and having the spaces between the cogs formed with sharp edges.

19. In a clam-shell bucket, the combination with scoops of operating mechanism including two intermeshing segments and a driving-pinion meshing with one of the segments.

In testimony whereof I hereunto affix my signature in the presence of two witnesses.

SWAN SWEDENBORG.

Witnesses:

E. Crockett,

E. N. Goddard.